(12) United States Patent
Billau et al.

(10) Patent No.: US 7,793,298 B2
(45) Date of Patent: *Sep. 7, 2010

(54) FACILITATING ACCESS TO INPUT/OUTPUT RESOURCES VIA AN I/O PARTITION SHARED BY MULTIPLE CONSUMER PARTITIONS

(75) Inventors: Ronald L. Billau, Rochester, MN (US); Charles S. Graham, Rochester, MN (US); Harvey G. Kiel, Rochester, MN (US); Chetan Mehta, Austin, TX (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/188,537

(22) Filed: Aug. 8, 2008

(65) Prior Publication Data

US 2008/0301692 A1    Dec. 4, 2008

Related U.S. Application Data (63) Continuation of application No. 10/830,350, filed on Apr. 22, 2004, now Pat. No. 7,530,071.

(51) Int. Cl.
*G06F 9/48* (2006.01)
*G06F 3/00* (2006.01)
(52) U.S. Cl. .................... 718/104; 719/324; 710/36
(58) Field of Classification Search ............... 718/100, 718/102, 104, 105; 719/324; 710/1, 17, 710/28, 36; 711/145, 147
See application file for complete search history.

(56) References Cited

U.S. PATENT DOCUMENTS 3,702,006 A    10/1972    Page (Continued)

FOREIGN PATENT DOCUMENTS

EP       0 574 691 A1    12/1993

(Continued)

OTHER PUBLICATIONS

Notification of Transmittal of the International Search Report and the Written Opinion of the International Searching Authority, or the Declaration, International Application No. PCT/EP2005/051236, filed Mar. 17, 2005.

(Continued)

*Primary Examiner*—Thomas Lee
*Assistant Examiner*—Caroline Arcos
(74) *Attorney, Agent, or Firm*—Steven Chiu, Esq.; Kevin P. Radigan, Esq.; Heslin Rothenberg Farley & Mesiti P.C.

(57) ABSTRACT

At least one input/output (I/O) firmware partition is provided in a partitioned environment to facilitate access to I/O resources owned by the at least one I/O firmware partition. The I/O resources of an I/O firmware partition are shared by one or more other partitions of the environment, referred to as consumer partitions. The consumer partitions use the I/O firmware partition to access the I/O resources. Since the I/O firmware partitions are responsible for providing access to the I/O resources owned by those partitions, the consumer partitions are relieved of this task, reducing complexity and costs in the consumer partitions.

17 Claims, 9 Drawing Sheets

U.S. PATENT DOCUMENTS

| | | |
|---|---|---|
| 5,414,851 A | 5/1995 | Brice, Jr. et al. |
| 5,600,805 A | 2/1997 | Fredericks et al. |
| 5,659,756 A | 8/1997 | Hefferon et al. |
| 6,112,263 A | 8/2000 | Futral |
| 6,125,411 A | 9/2000 | Sato |
| 6,351,782 B1 | 2/2002 | Eaves |
| 6,587,938 B1 | 7/2003 | Eilert et al. |
| 6,594,785 B1 | 7/2003 | Gilbertson et al. |
| 6,725,284 B2 | 4/2004 | Ardnt |
| 6,985,951 B2 | 1/2006 | Kubala et al. |
| 7,089,558 B2 | 8/2006 | Baskey et al. |
| 7,266,658 B2 | 9/2007 | Harrington et al. |
| 2002/0152344 A1 | 10/2002 | Holm et al. |
| 2002/0184345 A1 | 12/2002 | Masuyama et al. |
| 2003/0009648 A1 | 1/2003 | Doing et al. |
| 2003/0041090 A1 | 2/2003 | Armstrong et al. |
| 2005/0204366 A1 | 9/2005 | Billau et al. |

FOREIGN PATENT DOCUMENTS

| | | |
|---|---|---|
| EP | 1 091 296 A2 | 4/2001 |
| WO | WO 02/073397 A2 | 9/2002 |
| WO | 2005/1036358 A2 | 4/2005 |

OTHER PUBLICATIONS

Greenberg et al., "A System Software Architecture for High-End Computing", Conference of High Performance Networking and Computing, 'Online!, pp. 1-15 (1997).

Mattson et al., "An Overview of the Intel TFLOPS Supercomputer", 'Online!, pp. 1-12 (1998).

I/O PARTITION CONFIGURATION FILE

```
I/O PARTITION ID —— 402
NUMBER OF PROCESSORS OR PERCENTAGE OF A PROCESSOR
MEMORY AVAILABLE —— 406
I/O ADAPTER 1 SLOT NUMBER: —— 408
   ADAPTER CONFIGURATION INFORMATION —— 410
   USING OS PARTITION ID
   USING OS PARTITION ID —— 412
            ⋮

I/O ADAPTER 2 SLOT NUMBER:
   ADAPTER CONFIGURATION INFORMATION
   USING OS PARTITION ID
   OVER-RIDE MAC ADDRESS —— 414
            ⋮

I/O ADAPTER 3 SLOT NUMBER:
   ADAPTER CONFIGURATION INFORMATION
   USING OS PARTITION ID
            ⋮

I/O ADAPTER 4 SLOT NUMBER:
   ADAPTER CONFIGURATION INFORMATION
   FAILOVER ADAPTER FOR ADAPTER 1 AND 3 —— 416
```

| CONSUMER PARTITION 1 *802* | CONSUMER PARTITION 2 *802* | CONSUMER PARTITION 3 *802* | CONSUMER PARTITION N *802* | I/O PARTITION 1 *804* | I/O PARTITION M *804* |

*fig. 8*

FACILITATING ACCESS TO INPUT/OUTPUT RESOURCES VIA AN I/O PARTITION SHARED BY MULTIPLE CONSUMER PARTITIONS

CROSS-REFERENCE TO RELATED APPLICATIONS

This application is a continuation of co-pending U.S. patent application Ser. No. 10/830,350, filed Apr. 22, 2004, entitled "Facilitating Access to Input/Output Resources Via an I/O Partition Shared by Multiple Consumer Partitions", by Billau et al., the entirety of which is hereby incorporated herein by reference.

TECHNICAL FIELD

This invention relates, in general, to partitioned environments, and in particular, to facilitating access to input/output resources of a partitioned environment.

BACKGROUND OF THE INVENTION

In a partitioned environment, a computing unit, such as a server, is partitioned into a plurality of partitions to create smaller independent systems within the computing unit. Partitioning is becoming popular as multiple smaller servers are consolidated into one or more bigger servers with multiple partitions. This consolidation provides better resource utilization, centralized management and greater flexibility, as customers are able to instantiate new servers/partitions more easily. Typically, one operating system (OS) instance runs in each partition, and the operating system instance either has its own dedicated I/O adapters, or it is able to share I/O adapters through specific techniques.

For example, an operating system may allow sharing of one or more adapters it owns via an interface to other partitions. This requires the operating system to be configured to enable sharing, which is frequently complex. Further, this technique is not robust, since other applications can run in the open partition; operating systems are not tailored for the purpose of sharing I/O adapters. Other shortcomings include security concerns, as well as timing concerns (e.g., dependencies between partitions for start-up and shutdown).

In a further example, sharing is provided through the use of specialized hardware that owns one or more adapters. This, however, increases system hardware costs, increases development costs by requiring the hardware to be built and integrated with industry I/O adapters, has a long development cycle for new I/O adapters, and unique I/O adapter sharing configuration.

Dedicated I/O adapters in each partition are expensive due to the cost of the adapters, slots, cabling, etc.; complex to manage/maintain; and typically underutilized, since utilization drops with an ever increasing number of partitions. Further, in both sharing cases described above, adding a partition and assigning virtual I/O (sharing an adapter owned elsewhere) requires configuration in multiple places with different tools.

Moreover, new I/O adapters are constantly being created. Dedicating them to individual operating systems requires that each operating system develop drivers and qualify the adapter. If they need to be shared, sharing code needs to be developed for each operating system.

As a multiple logical partitioned server grows in size, the number of logical partitions, i.e., operating system instances, grows proportionally. This places additional demands on the number of I/O adapters supported based on the number each operating system needs for bandwidth, availability and latency. The cost of supporting these increasing numbers of dedicated adapters is incurred both in development and in the cost that is passed on to the customer.

Today's on-demand environment requires efficiency from a development perspective for server manufacturers, and from a total cost of ownership perspective for information technology (IT) consumers. Time to market is also a critical criterion for success for both server manufacturers and IT consumers who have to deliver computing and applications within a window of opportunity. Thus, a need exists for an enhanced capability to facilitate sharing of I/O resources. In particular, a need exists for a capability that facilitates access to I/O resources of a partitioned environment.

SUMMARY OF THE INVENTION

The shortcomings of the prior art are overcome and additional advantages are provided through a method of facilitating access to I/O resources of a partitioned environment. The method includes, for instance, providing an I/O partition in the partitioned environment, the I/O partition being coupled to one or more consumer partitions of the partitioned environment and providing access to one or more I/O resources coupled to the I/O partition; and employing, by at least one consumer partition of the one or more consumer partitions, the I/O partition to access at least one I/O resource of the one or more I/O resources.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided to facilitate access to I/O resources of a partitioned environment. Within the partitioned environment, one or more I/O partitions are created and used to manage access to I/O resources by other partitions in the environment. For instance, an I/O partition owns one or more adapters that are shared by one or more other partitions of the environment.

Figure 1:
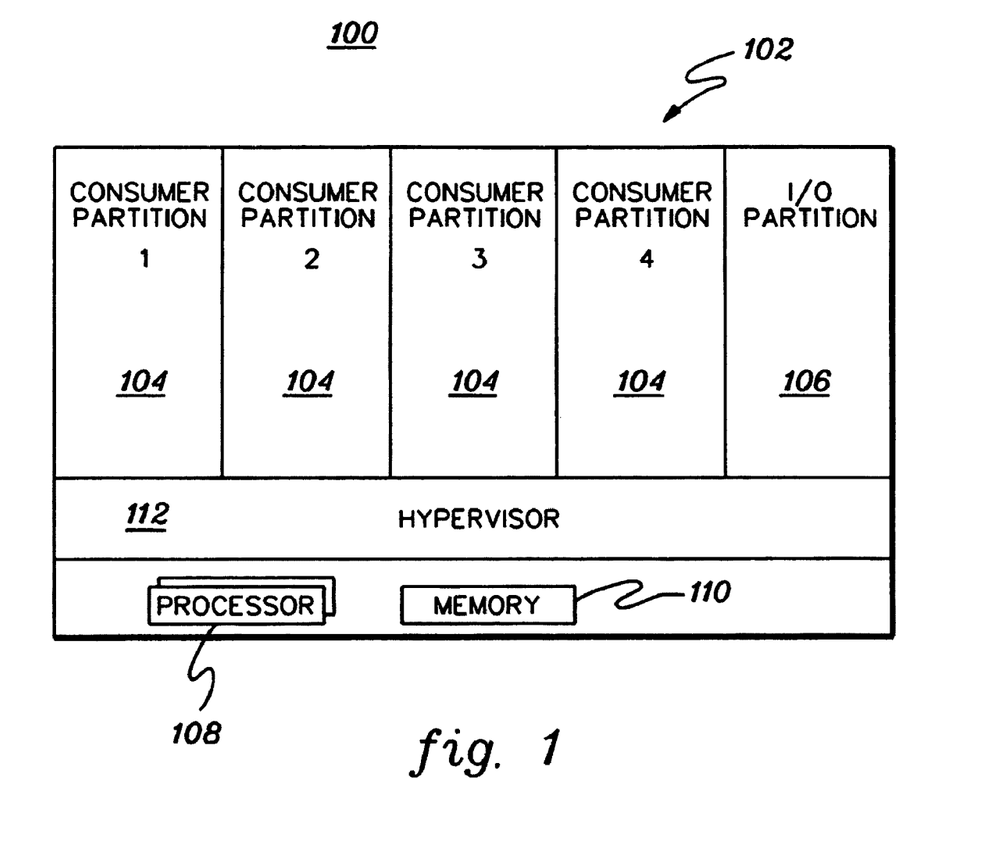
FIG. 1 depicts one embodiment of a partitioned computing environment, in accordance with an aspect of the present invention.

One embodiment of an environment to incorporate and use one or more aspects of the present invention is described with reference to FIG. 1. A partitioned environment 100 includes a server 102, such as a pSeries server offered by IBM®, that is partitioned into a plurality of partitions. (IBM® is a registered trademark of International Business Machines Corporation, Armonk, N.Y., U.S.A. pSeries and other names used herein may be registered trademarks, trademarks or product names of International Business Machines Corporation or other companies.)

As an example, server 102 includes one or more consumer partitions 104, each of which functions as a separate system and may include an operating system, such as AIX or Linux, or other control code. The consumer partitions are responsible for executing applications and processing work, some of which requires access to I/O resources. The access is not performed directly by the consumer partitions, but via another entity, as described herein. Thus, the consumer partitions employ virtual I/O processing. Although four consumer partitions are shown, in other embodiments, more or less consumer partitions may be included.

Server 102 also includes, in accordance with an aspect of the present invention, one or more I/O partitions 106 used to facilitate access to I/O resources. It is the I/O partitions that provide the consumer partitions with access to the I/O resources, thus, relieving the consumer partitions of various tasks associated with I/O processing. In this embodiment, an I/O partition is a firmware partition. That is, the partition is based on the architecture and platform of the server and includes components of the server being partitioned, eliminating the need for specialized hardware.

Each partition (104, 106) is, for instance, a logical partition and has associated therewith at least a portion of one or more physical processors 108 and memory 110 residing within server 102. In particular, each partition has one or more logical processors associated therewith, in which each logical processor represents all or a share of a physical processor allocated to the partition. The logical processors of a particular partition may be either dedicated to the partition, so that the underlying processor resource is reserved for the partition; or shared with another partition, so that the underlying processor resource is potentially available to another partition.

The consumer partitions are coupled to the one or more I/O partitions via a hypervisor 112, which is used as a conduit or transport between the partitions. The hypervisor is also responsible for management of various aspects of the partitions. One example of a hypervisor that can be employed, in accordance with an aspect of the present invention, is the POWER hypervisor, offered by IBM®. Additional details regarding logical partitions and hypervisors are described in "Dynamic Logical Partitioning in IBM eServer pSeries," International Business Machines Corporation, 2002, pages 1-9 available at IBM® and at http://www-1.ibm.com/servers/eserver/pseries/hardware/whitepapers/dlpar.html; U.S. Patent Application No. 2002/0152344 A1, entitled "Method For Processing PCI Interrupt Signals In A Logically Partitioned Guest Operating System," Holm et al., Oct. 17, 2002; U.S. Patent Application No. 2003/0009648 A1, entitled "Apparatus For Supporting A Logically Partitioned Computer System," Doing et al., Jan. 9, 2003; and U.S. Patent Application No. 2003/0041090 A1, entitled "Yield On Multithreaded Processors," Armstrong et al., Feb. 27, 2003, each of which is hereby incorporated herein by reference in its entirety.

The coupling of a consumer partition and an I/O partition is further described with reference to FIG. 2. In this example, the consumer partition includes an operating system, and thus, is also referred to herein as an operating system partition. However, in other examples, the consumer partitions may include entities other than operating systems, such as control code or other entities.

Figure 2:
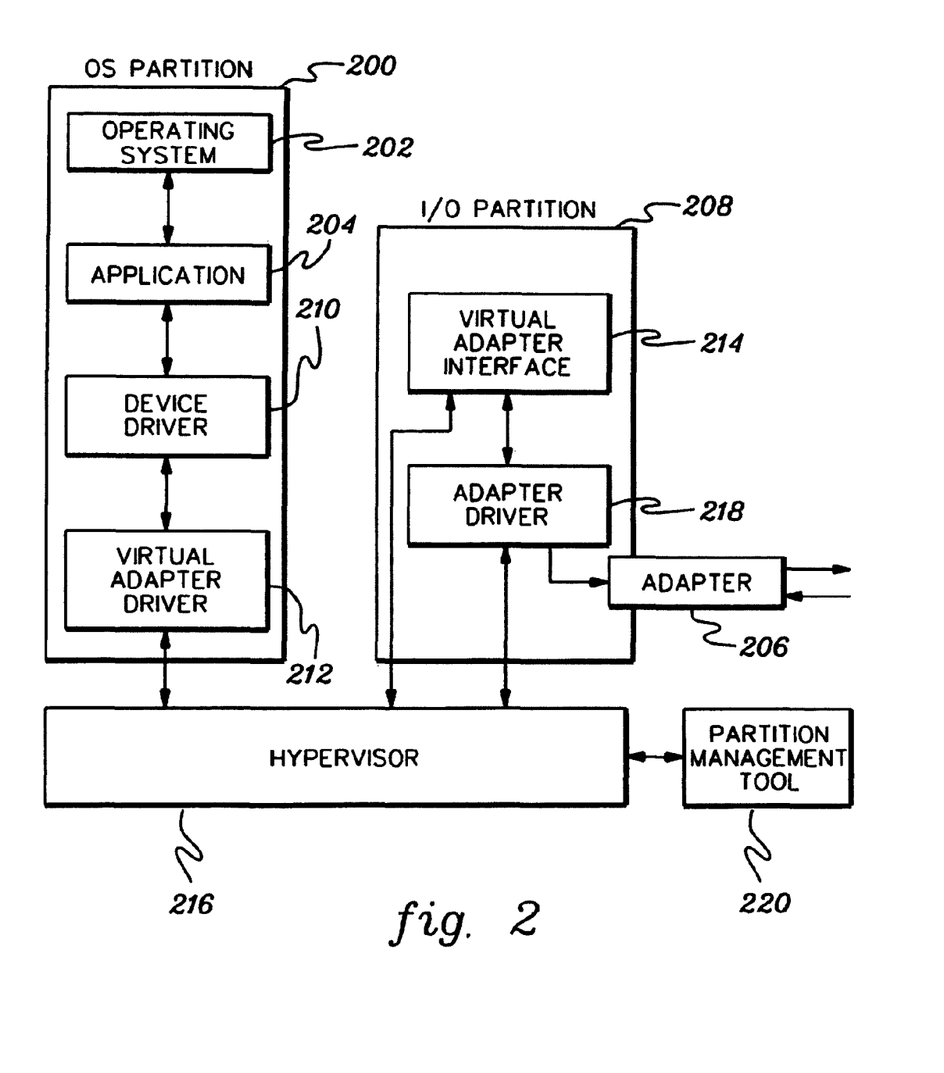
FIG. 2 depicts further details of a consumer partition of the partitioned environment, such as an operating system partition, being coupled to an I/O partition of the environment, in accordance with an aspect of the present invention.

Referring to FIG. 2, an operating system partition 200, which includes an operating system 202, is configured to share at least one I/O adapter 206 owned by an I/O partition 208. The I/O adapter, including an indication of the class of adapter, is defined to the operating system, but other specialized configuration information, such as failover and link aggregation, is defined in the I/O partition. The operating system partition employs the I/O partition to access the adapter, and thus, I/O devices coupled thereto.

To access an adapter owned by the I/O partition, in one example, an application 204 of the operating system partition issues an I/O request, such as an open, read, write, or close, that is received by a device driver 210 of the operating system partition. Device driver 210 builds a command for the I/O device (e.g., disk device, network device, etc.) to be accessed and forwards the command, in accordance with an aspect of the present invention, to a virtual adapter driver 212 of the operating system partition.

The virtual adapter driver replaces a physical adapter driver in the operating system partition and is paired with a virtual adapter interface 214 in I/O partition 208. The virtual adapter driver is less complex than a physical adapter driver and is generic to a class of adapters. The interface for the virtual adapter driver is standardized based on the type of adapter class. That is, it includes information common to that class of adapters. However, specific information, such as specialized information for a particular adapter manufacturer, is specified in the interfaces for the physical adapter drivers located in the I/O partition. The physical adapter drivers can vary greatly in their interfaces, which are usually proprietary. By using virtual adapter drivers, once an operating system is set up to handle a particular class of virtual adapter, it can access any physical adapter of that class, subsequent to the I/O partition being set up with the physical adapter. With virtual adapter drivers, each operating system does not have to implement I/O adapter sharing for each type of adapter. The sharing capability is provided once in the I/O partition and accessed based on the virtual adapter driver for that class.

The virtual adapter driver recognizes that there is a special type of communication with a virtual adapter interface and it initializes a connection with that interface. This includes, for instance, indicating which I/O partition to connect to and which virtual adapter is being used. The virtual adapter driver also sends a message to a hypervisor 216 to establish queues for communication. Communication between the virtual adapter driver and the virtual adapter interface is via hypervisor 216. The hypervisor is the conduit or transport between the two partitions. It is responsible for providing connections between the partitions and for moving data between the partitions. In one example, it uses command and response queues for communication.

Following the initialization phase, there is a negotiation phase in which the virtual adapter driver and the corresponding virtual adapter interface communicate regarding the settings of the virtual adapter driver requests, the characteristics of the physical adapter and what settings other virtual adapter drivers (who are sharing that adapter) are using. Some of these may be mutually exclusive and others are mere changes in the adapter's settings. Examples of mutually exclusive settings that could cause a failure in this phase include a MAC address override from multiple virtual adapter drivers, or incompatibilities in the size of the packets that will be sent, etc.

In response to successfully completing the negotiation phase, the virtual adapter driver takes commands from device driver 210, encapsulates them as messages, and sends them to hypervisor 216 to be placed on the queue for the virtual adapter interface. These commands include the standard command formats of a command with a set of send or receive buffers for networking, and a command with a set of read or write buffers for storage, as examples. Hypervisor 216 signals to virtual adapter interface 214 that a command is waiting (or in another embodiment, the virtual adapter interface periodically checks the queue for commands).

The virtual adapter interface in the I/O partition initializes a connection with the virtual adapter driver. As part of this initialization, the interface may perform specialized processing including checking whether the partition (e.g., operating system) has authority to access the physical adapter and validating the device, if appropriate. The virtual adapter interface retrieves the command from the queue and remaps the command, if needed, so that it is appropriate for the device. For instance, it may change a logical block number, implement link aggregation, and/or implement other advanced functioning, such as offload. The virtual adapter interface then issues the command to a physical adapter driver 218 of the I/O partition.

Adapter driver 218 receives the command from the virtual adapter interface, encapsulates it in the appropriate protocol format (e.g., Ethernet frames) and issues the command to physical adapter 206, which forwards the command to a device. The adapter driver also handles timing to ensure that the physical link operates accurately; flow control so that a down stream entity is not flooded; and recovery/retries for the adapter, including resetting the adapter; re-trying the adapter; returning to a previous point and resending the command, etc., as examples.

When a response, which may include data, response codes and/or other information, comes back from the device, it is received by adapter 206 and passed to adapter driver 218. Adapter driver 218 forwards the response to virtual adapter interface 214, which then sends the response to virtual adapter driver 212 via hypervisor 216. The virtual adapter interface is responsible for recovery of the I/O devices, such as handling attention pending conditions or retries, and for terminating its connection with virtual adapter driver 212.

Pursuant to receiving the response, virtual adapter driver 212 passes the completed response to device driver 210, which, in turn, passes the response to application 204. The virtual adapter driver also terminates its connection with virtual adapter interface 214. As examples, the termination of the connections with virtual adapter interface 214 and virtual adapter driver 212 can occur after each I/O request is processed, after a predetermined number of requests are processed, at a point in time designated by the operating system, or at any other selected time. This concludes the I/O processing, which is facilitated by employing at least one I/O partition to access I/O resources owned by the at least one I/O partition.

In order to use one or more I/O partitions to facilitate access to I/O resources owned by those partitions, each I/O partition is created and configured. In one example, the creating and configuring are performed by a partition management tool 220, which is coupled to hypervisor 216. The partition management tool includes a set of functions implementable in a number of different physical forms. In one example, it is implemented on a management console, e.g., a hardware management console, executing on a computing unit, such as an external personal computer (e.g., a ThinkPad offered by IBM®). As a further example, it is implemented via a web browser interface. The partition management tool has the responsibility for creating and configuring each I/O partition, including specifying which I/O adapters it owns, identifying the one or more consumer partitions that can share the I/O adapters, specifying the amount of resources to be allocated to the I/O partition, etc. It further has the responsibility for configuring the consumer partitions, including assigning operating systems to those partitions and allocating resources to the partitions.

Figure 3:
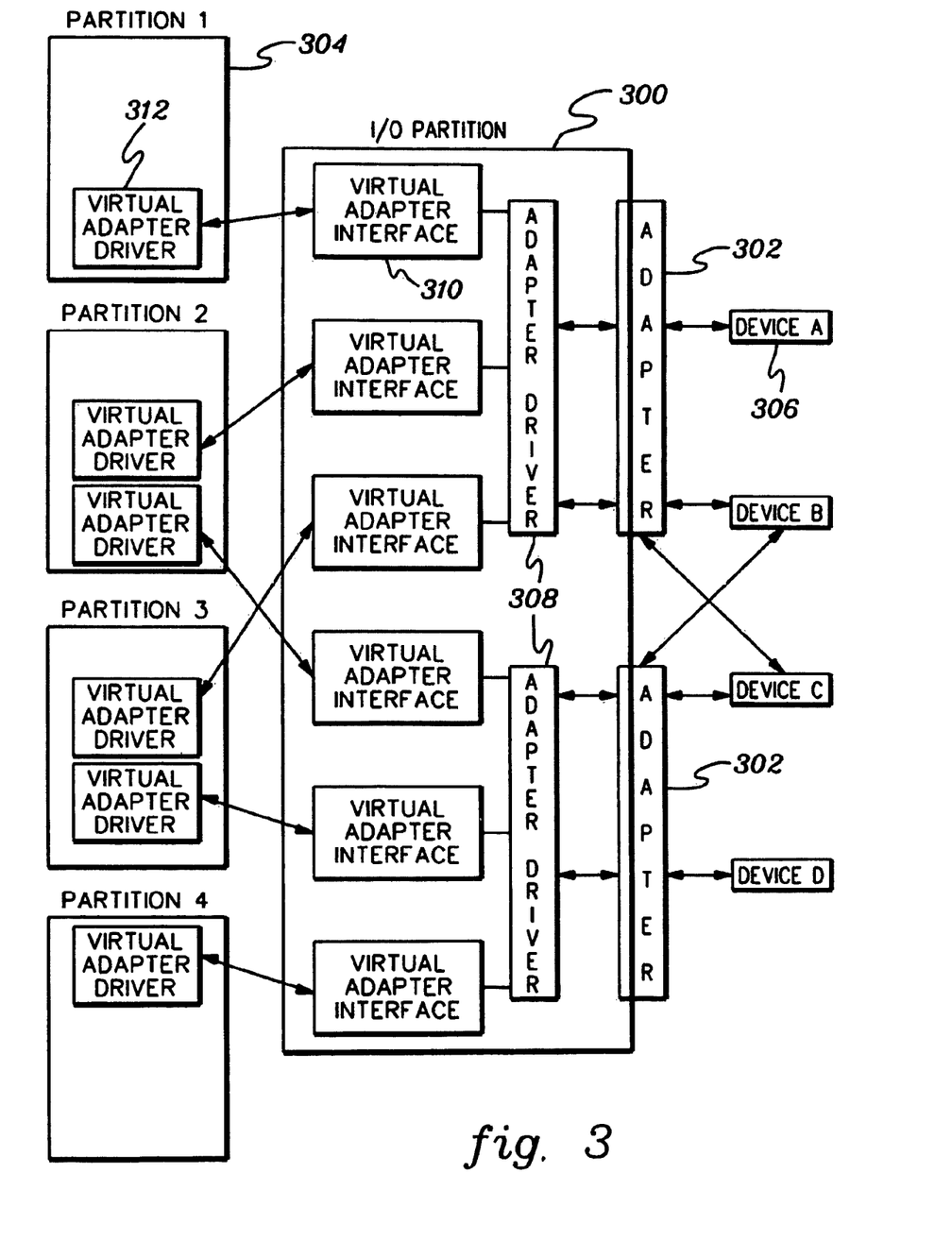
FIG. 3 pictorially depicts multiple partitions having access to one or more adapters via an I/O partition, in accordance with an aspect of the present invention.

Each I/O partition may be configured in various ways. In one example, an I/O partition is configured with a plurality of adapters to be shared by a plurality of consumer partitions, as shown in FIG. 3. For instance, an I/O partition 300 includes a plurality of physical adapters 302, each of which is coupled to the I/O partition (e.g., located within, external but coupled to, or therebetween) and is accessible by one or more consumer partitions 304. Physical adapter 302 is coupled to one or more devices 306 and to at least one physical adapter driver 308. Adapter driver 308 is further coupled to one or more virtual adapter interfaces 310. A virtual adapter interface is provided for each class of adapters. Since the interfaces are part of the I/O partition, idiosyncrasies of adapter interfaces are confined to the I/O partition. For example, knowledge of specific vendor manufacture details is confined to the I/O partition, and need not be provided or propagated to each operating system, etc.

The I/O partition takes requests from multiple virtual adapter drivers 312 of one or more consumer partitions and multiplexes them out over the physical adapters. This keeps a physical adapter busy and allows multiple consumer partitions (e.g., multiple operating systems) to share a single physical adapter. Additional capacity for peak usage and redundancy can be configured over multiple adapters of the same type. For instance, Partition 2 has two virtual adapter drivers, each coupled to a different physical adapter driver/adapter pair. By sharing adapters and requiring fewer adapters, there are fewer slots, drawers, cables, switches and other downstream infrastructure for the user to purchase and manage.

When an I/O adapter fails, the I/O partition can automatically reroute I/O requests over another adapter that provides connectivity to the same device. This is accomplished using one or more of various routing techniques. For instance, a table is maintained of devices and adapters and when one adapter fails, another is selected. Advantageously, instead of requiring one failover adapter per operating system partition using dedicated adapters, the I/O partition can own one or more adapters that can be used for failover by many partitions.

Further, workloads typically have peaks and valleys. When an operating system has dedicated adapters, the number of adapters allocated to it are based on its peak usage. This means that at non-peak times, there is a great deal of under-utilized capacity. Also, the peaks and valleys of workloads do not automatically fall at the same time. By using an I/O partition, when one operating system partition needs additional capacity or sees unexpectedly high workload peaks, capacity can be borrowed from another operating system partition that is not fully utilizing its capacity. For instance, the I/O partition can route requests over other adapters enabled to be shared by the partitions. Again, various routing techniques may be used. This provides the peaking operating system with the capacity it needs without having to over-configure the entire system. For unexpectedly high peaks, additional capacity can be borrowed more dynamically without manual intervention. This provides on-demand computing.

In order to configure an I/O partition, an I/O partition configuration file is created by the partition management tool. The hypervisor uses this file to allocate processor(s) and memory to an I/O partition, and to initiate creation of virtual adapter drivers in consumer partitions for shared I/O adapters. The I/O partition uses this file to determine which adapters it owns; which consumer partitions are allowed to share each owned adapter; and which functions, such as failover and link aggregation, are supported by each owned adapter. One example of a configuration file for an I/O partition is described with reference to FIG. 4.

Figure 4:
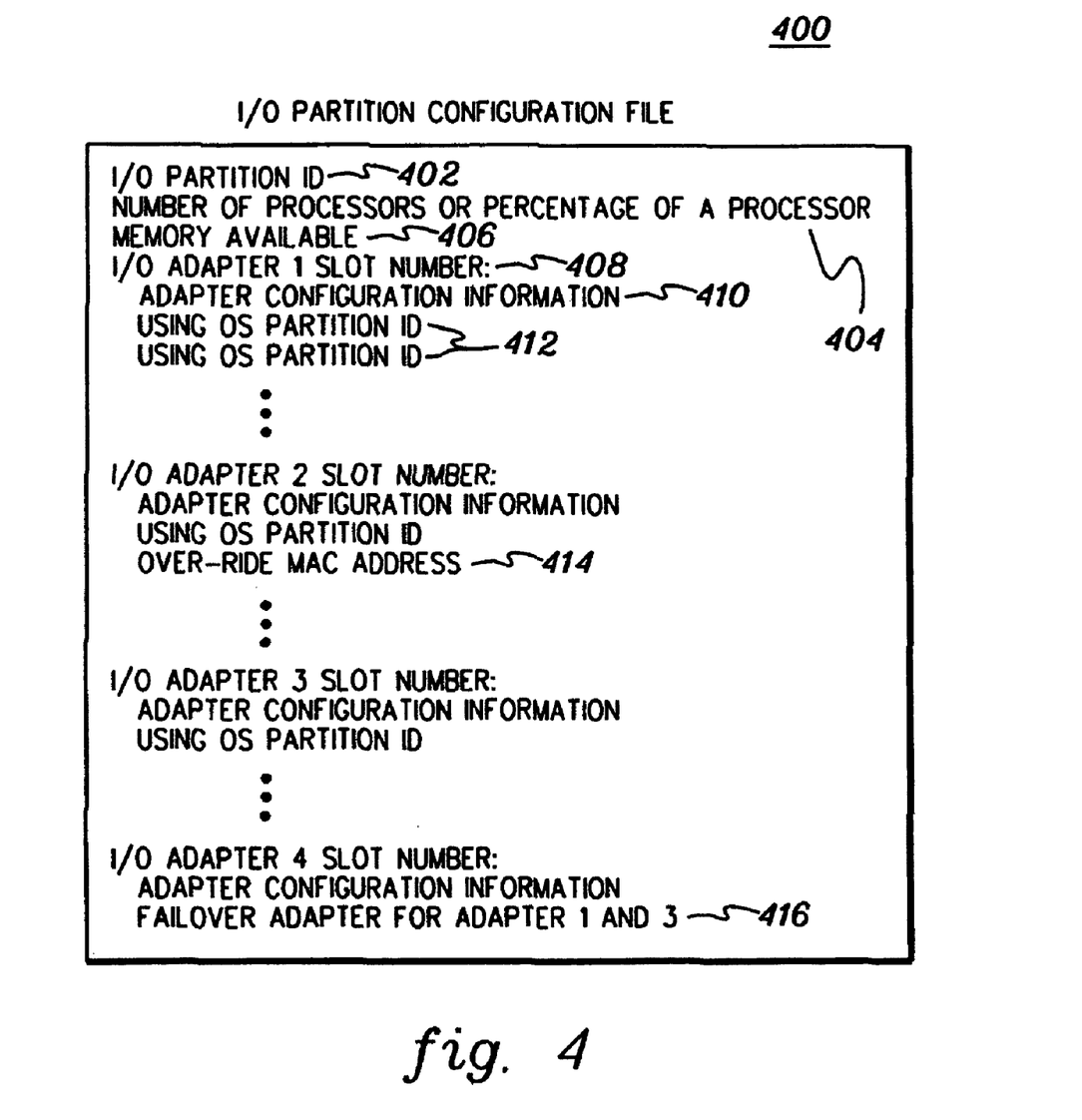
FIG. 4 depicts one embodiment of an I/O partition configuration file, in accordance with an aspect of the present invention.

An I/O partition configuration file 400 includes, for instance, an I/O partition id 402 identifying the I/O partition for which this configuration file is created; a number of processors or a percentage of a processor 404 to be allocated to the I/O partition; and an amount of memory 406 (e.g., a predefined amount, a given range, etc.) to be made available to the partition. Additionally, for each adapter to be owned by the I/O partition, an entry is created in the configuration file for that adapter. Each entry includes, for instance, an I/O adapter slot number 408; adapter configuration information 410 for this adapter, including, for instance, address, buffer size, available storage devices associated with the adapter, etc.; and one or more ids of operating system partitions (or other consumer partitions) 412 allowed to use this adapter. Other information may be included in the entry, such as user defined information, including, for instance, an override of a media access control (MAC) address definition 414, an indication as to whether a particular adapter is a failover adapter 416, an indication as to whether link aggregation is supported, etc. Other types of information may also be included in an adapter entry and/or within the configuration file.

Figure 5A:
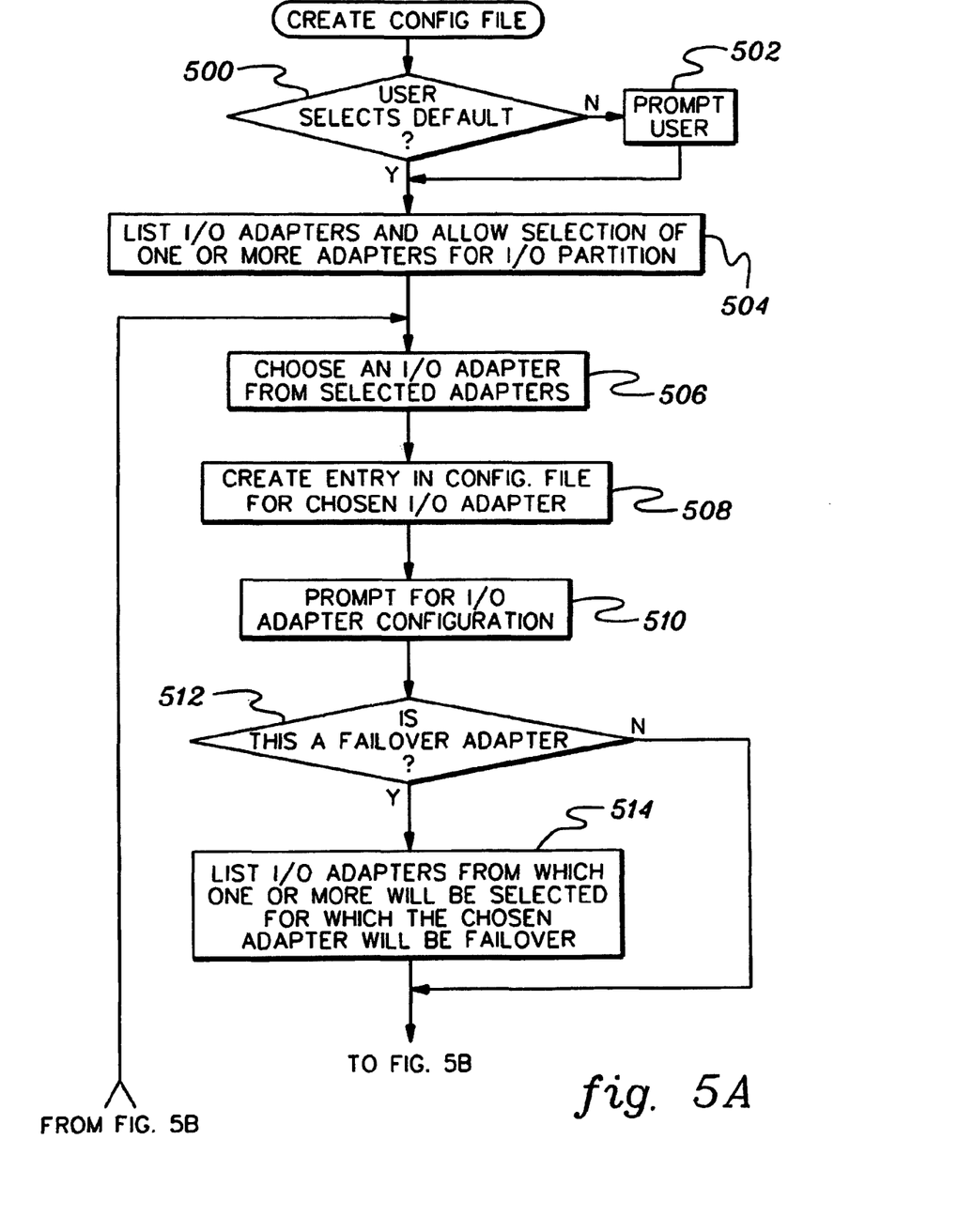
FIGS. 5A-5B depict one embodiment of the logic associated with creating an I/O partition configuration file, in accordance with an aspect of the present invention.
Figure 5B:
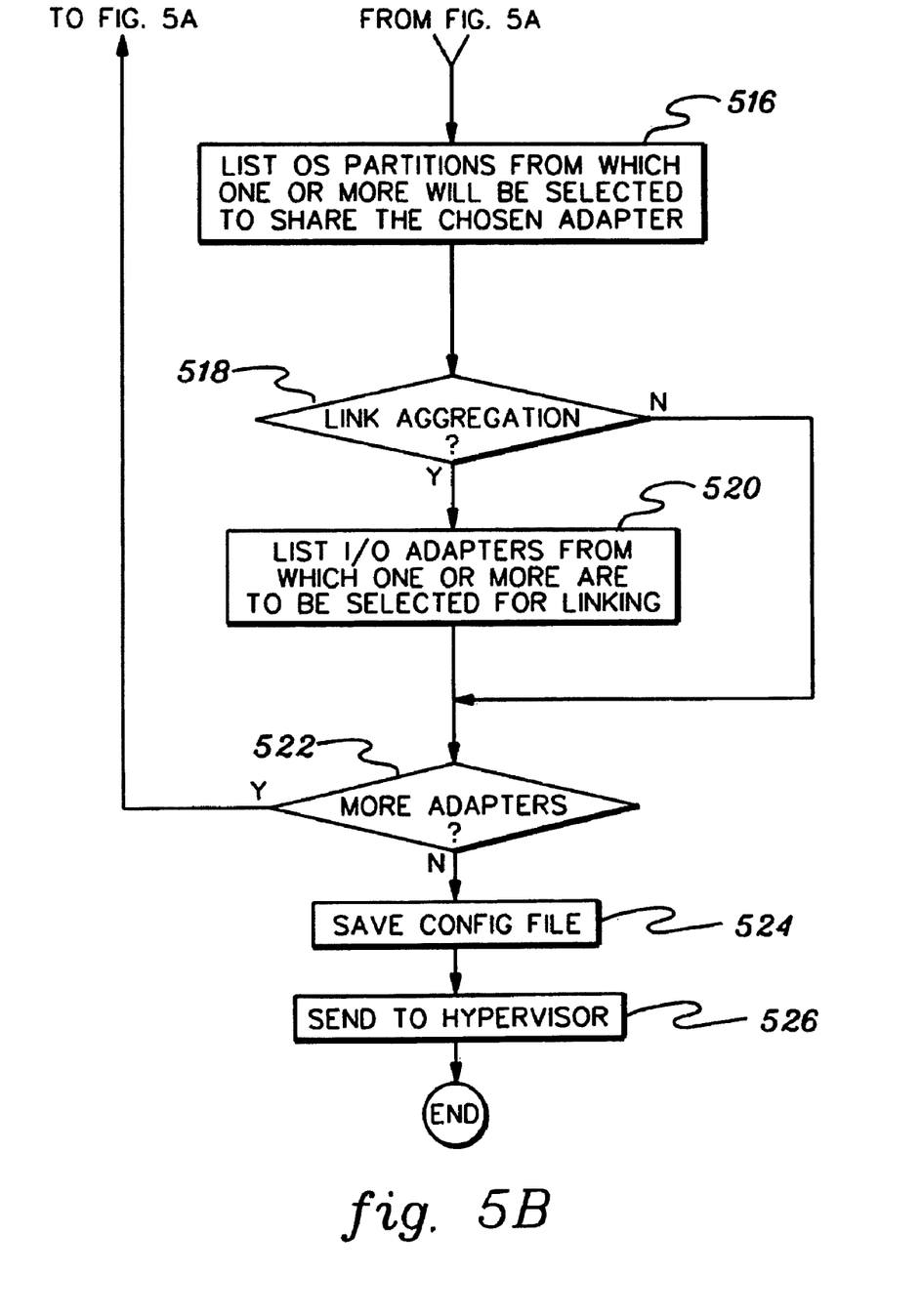

One embodiment of the logic associated with creating a configuration file for a particular I/O partition is described with reference to FIG. 5. In this example, the configuration file is created by the partition management tool. Initially, an inquiry is made as to whether the user has selected the defaults for processor and memory requirements for the I/O partition, INQUIRY 500. If the user has not selected the defaults, then the user is prompted for processor and memory requirements, STEP 502. Thereafter, or if the user has selected the defaults, a list of the I/O adapters on the server is provided and the user or administrator selects one or more adapters to be owned by the I/O partition, STEP 504.

Subsequently, an I/O adapter is chosen from the selected adapters, STEP 506. For that chosen I/O adapter, an entry in the configuration file is created, STEP 508, and the user is prompted for any I/O adapter configuration required or desired for this type of adapter, STEP 510. For example, the user can be prompted for an indication of whether this adapter is to be configured for failover, link aggregation, or other types of configurations.

Subsequently, a determination is made as to whether this is a failover adapter, INQUIRY 512. If it is a failover adapter, then a list of the other I/O adapters of this type owned by the I/O partition is provided. From the list, one or more adapters are selected for which the adapter being configured will be a failover adapter, STEP 514. Thereafter, or if this is not a failover adapter, a list of operating system partitions is provided from which one or more will be selected to share the chosen adapter, STEP 516.

Next, a determination is made as to whether this I/O adapter supports link aggregation and whether the user selects to use link aggregation, INQUIRY 518. If the adapter supports link aggregation and the user selects link aggregation, a list of the other I/O adapters of this type owned by the partition is provided, STEP 520. From this list, one or more adapters are selected to be bound together for link aggregation.

Thereafter, or if link aggregation is not supported or selected, a determination is made as to whether there are more adapters to be configured, INQUIRY 522. If there are more adapters to be configured, then processing continues with STEP 506 "Choose An I/O Adapter From Selected Adapters." However, if there are no more adapters to be configured, then the configuration file is saved in memory associated with the partition management tool, STEP 524, and sent to the hypervisor, STEP 526.

When the hypervisor receives the configuration file, it uses it to configure the I/O partition identified in the configuration file, if necessary, as well as to possibly configure one or more consumer partitions to support the I/O partition. One embodiment of the logic associated with employing the configuration file to configure one or more partitions is described with reference to FIG. 6. Initially, a determination is made as to whether this configuration file is for a new I/O partition, INQUIRY 600. If it is for a new partition, then one or more processors or a portion of a processor, as well as a portion of memory, are allocated to the new partition, as indicated in the configuration file, STEP 602. However, if this is not a configuration file for a new partition, a further determination is made as to whether this configuration file indicates any changes to processor or memory resources for the existing I/O partition, INQUIRY 604. Should the configuration file indicate changes to processor or memory resources, then those resources are reallocated, as designated, STEP 606.

Figure 6:
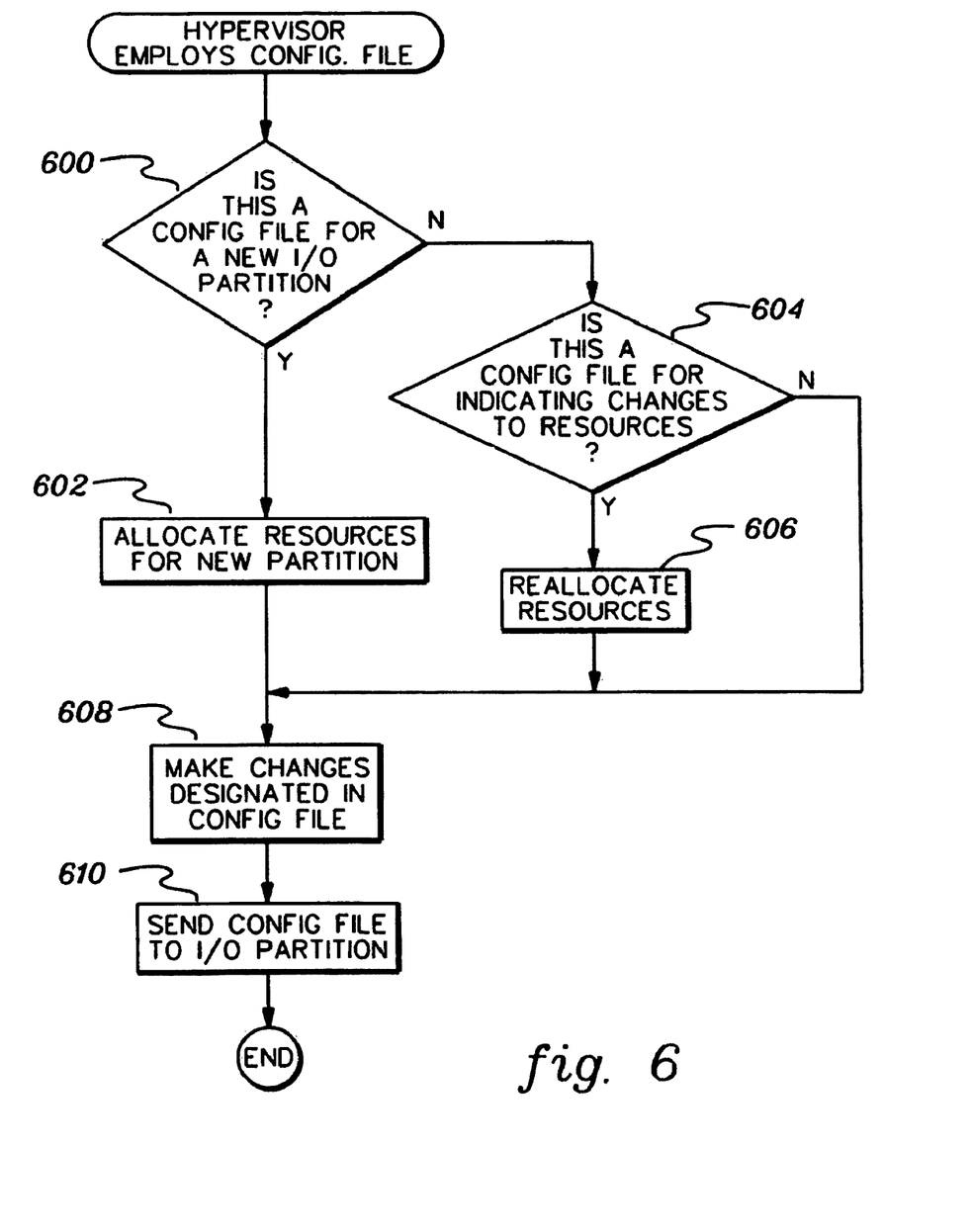
FIG. 6 depicts one embodiment of the logic associated with employing the I/O partition configuration file by a hypervisor to configure partitions of the partitioned environment, in accordance with an aspect of the present invention.

Thereafter, or if there are no resource changes to be made, then processing continues with implementing the zero or more changes designated in the configuration file, STEP 608. In particular, the configuration file is searched for operating system partitions that have been added to or removed from I/O adapter entries. If a remove is indicated, then the virtual adapter driver is removed from the operating system partition. This includes, for instance, deallocating resources, such as memory, and providing clean-up, if desired.

If an add is indicated, then a virtual adapter driver is created in the operating system partition. This includes, for instance, building a message in the memory of the operating system partition that includes a command to create a virtual adapter driver, an indication of the class of virtual adapter driver (for example, Ethernet or storage), a partition ID of the I/O partition that owns the adapter, and a virtual adapter driver ID (note: an operating system partition can have multiple virtual adapter drivers for multiple I/O adapters owned by one I/O partition); and generating an interrupt, so that the operating system partition finds and processes the message.

When the operating system partition obtains the message, the operating system allocates resources for the virtual adapter driver. One type of resource to be allocated is memory. The amount of memory to be allocated varies depending on the class of virtual adapter driver. The operating system also stores the I/O partition ID and virtual adapter ID, and initially sets the adapter state to unavailable. If this is the first instance of a virtual adapter of this class in the partition, a virtual adapter driver for this type of virtual adapter is loaded. Additionally, the operating system sets up its end of a command/response queue to communicate with the I/O partition for this virtual adapter.

Subsequent to making any designated changes in the configuration file or at another selected time, the configuration file is sent to the I/O partition, STEP 610. When the I/O partition receives the configuration file, it employs the file to configure one or more resources of the partitioned environment. One embodiment of the logic associated with employing the configuration file to configure the resources of one or more partitions is described with reference to FIG. 7.

Figure 7:
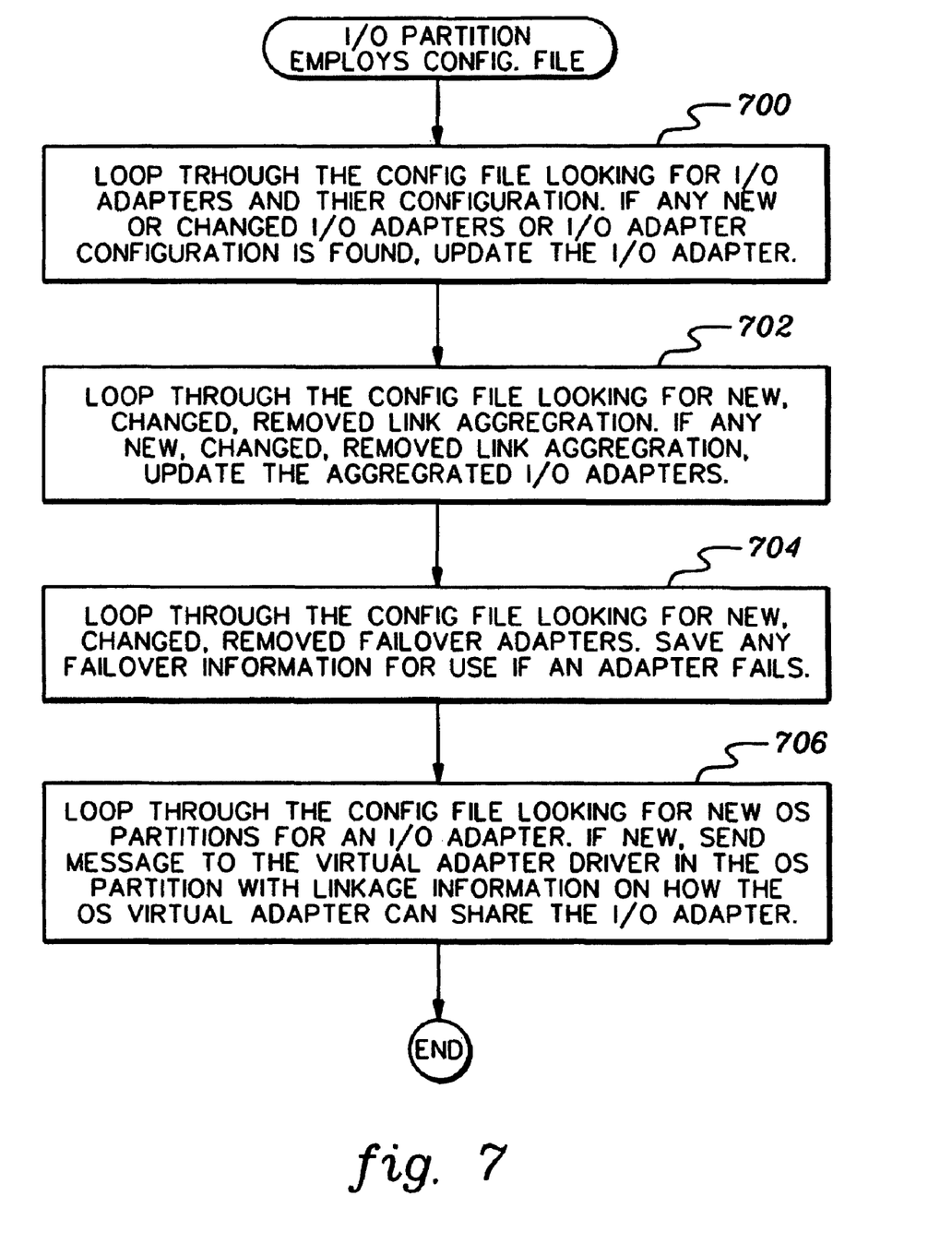
FIG. 7 depicts one embodiment of the logic associated with configuring I/O resources of the partitioned environment based on the I/O partition configuration file, in accordance with an aspect of the present invention.

Initially, the configuration file is searched for I/O adapters and their configurations, STEP 700. If there are any new or changed I/O adapters, or new or changed I/O adapter configurations in the configuration file, then each of those adapters is updated, as indicated. For instance, the property of a physical adapter may be changed.

Moreover, the configuration file is searched for new, changed, or removed link aggregation status. If any new, changed, or removed link aggregation status is detected, the aggregated I/O adapters are updated, STEP 702. This may include, for instance, removing an indication of link aggregation, linking another adapter, etc.

Further, the configuration file is searched for new, changed or removed failover adapters. If any failover information is provided, it is saved for later use should an adapter fail, STEP 704.

Additionally, the configuration file is searched for new operating system partitions (or other consumer partitions) that are allowed to share an I/O adapter. If there are new operating system partitions enabled to share a particular adapter, then a message is sent to a virtual adapter driver in the operating system partition with linkage information on how the operating system virtual adapter can share the I/O adapter, STEP 706.

In particular, when the I/O partition processes the configuration file and finds a new operating system partition that is allowed to share an adapter, the I/O partition updates internal tables(s) with information on operating system partitions allowed to share the adapter; performs a configuration update in the physical I/O adapter, if required (for example, add a new ID in I/O adapter memory tag data belonging to the new operating system partition; for example, a new Ethernet MAC address); sets up its end of a command/response queue to communicate with the operating system partition for this virtual adapter; and sends a message to the queue of the operating system partition with configuration information about the I/O adapter; including, for instance, what functions it supports, and configuration information for the virtual adapter (e.g., Ethernet MAC address, Ethernet transmit buffer size, storage devices available from a storage adapter, etc.).

The operating system partition receives this message and completes configuration of the virtual adapter driver making the virtual adapter driver available for application use. Note that, in this embodiment, the application interface to a virtual I/O adapter driver should be the same or nearly the same as an application interface to a physical I/O adapter driver. This concludes configuration processing by the I/O partition.

Figure 8:
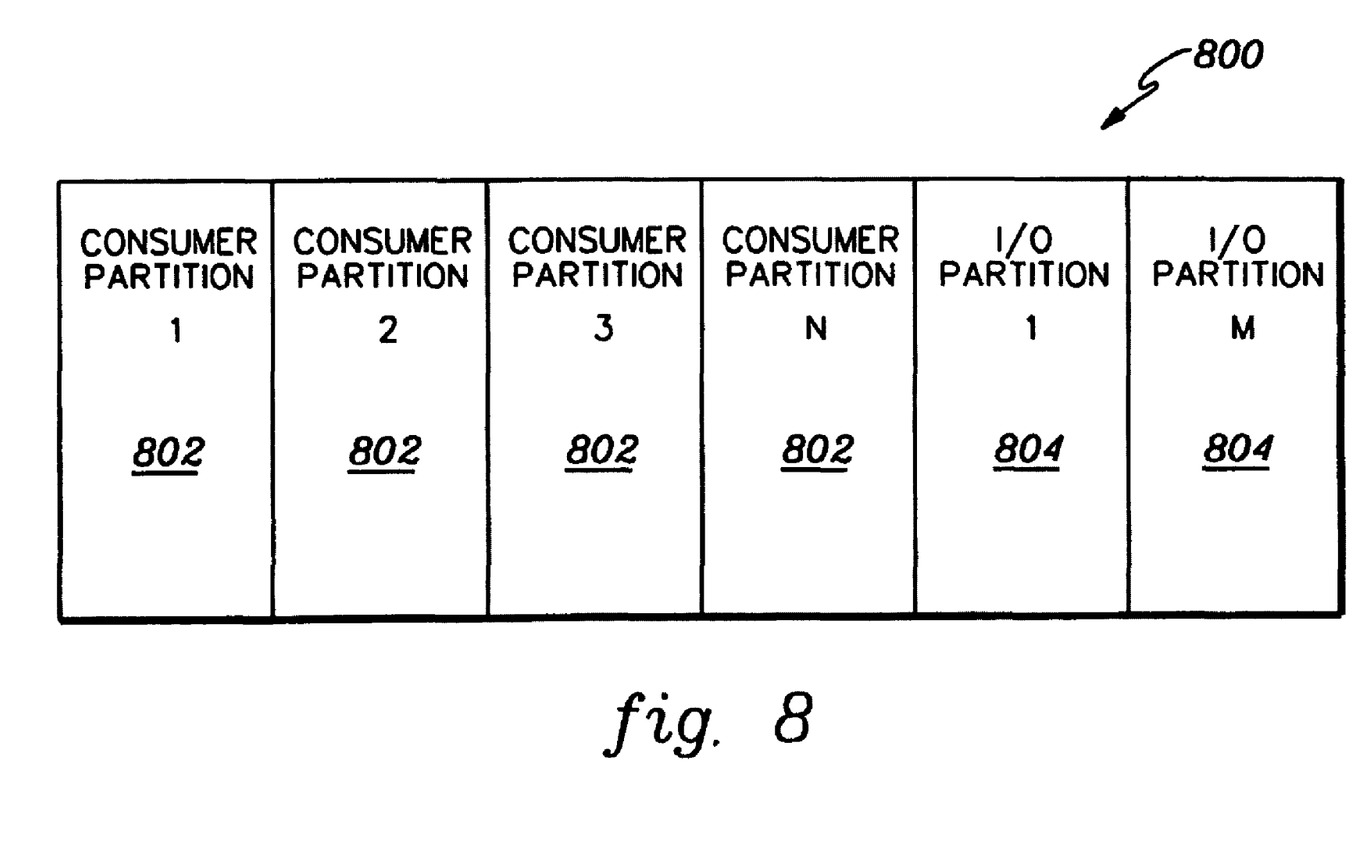
FIG. 8 depicts one example of a partitioned environment that includes a plurality of I/O partitions, in accordance with an aspect of the present invention.

Although in the embodiment described above a server is configured with one I/O partition, a server can be configured with multiple I/O partitions. One example of a server having multiple I/O partitions is depicted in FIG. 8. As shown, a server 800 includes a plurality of consumer partitions 802 and a plurality of I/O partitions 804. In this embodiment, there is a set of command/response queues for each I/O partition and one or more virtual adapter driver/virtual adapter interface pairs for each I/O partition.

There are numerous reasons and benefits for configuring multiple I/O partitions. For instance, multiple I/O partitions can be configured for isolation, in which groups of partitions can have one or more of their own I/O partitions. This can be for reliability or security reasons. Further, multiple I/O partitions can also be used for availability and scalability. A consumer partition can switch between multiple I/O partitions for multipathing, and to use another I/O partition when one I/O partition is unavailable. Various algorithms may be used for multipathing, including a round robin approach. Configuring multiple I/O partitions also enables the firmware in the I/O partition to be updated without impacting I/O initiated by consumer partitions.

By providing I/O access in an I/O partition, the resources provided to it can be adjusted dynamically by the IT consumer. While it can be configured with a default set of processor and/or memory resources, the system administrator can dynamically and immediately adjust the resources up or down to conform to the changing environment, since it is a partition. In one example, this is accomplished via the configuration file. If there is an I/O bottleneck, the resources allocated to the partition can be increased to relieve the bottleneck. If, on the other hand, there is a need for resources elsewhere, the resources in the I/O partition can be decreased to accommodate the other demands. This can be done automatically by the hypervisor based on ranges and limits set by the system administrator. Running in a partition therefore provides fine-grained control over the performance of the server system.

The I/O partition can also allocate the expensive, high bandwidth, high performance adapters to the partitions that need them. For example, during the day, the high bandwidth Fibre Channel adapters can be allocated to the operating system cluster that is running database applications. After hours, that set of Fibre Channel adapters can be used by the operating system that is performing the backup of the business critical data, since that has to complete within a certain window, without re-allocation.

I/O partitions are similar to the hypervisor in that they are not subject to customer modification. Running the I/O partition code in a partition makes partition management more standard for the server. Application code does not run in an I/O partition, in this embodiment, and therefore, does not impact the operation of the I/O partition, either deliberately or accidentally. This enhances the security of the function and provides robustness and reliability.

The I/O partition is monitored and managed by the hypervisor and partition management tool. It is booted up first automatically when the server is booted. Therefore, when operating systems want to connect their virtual adapter drivers, the I/O partition is already up and operational. I/O adapter sharing is configured by the partition management tool. Intelligence in the configuration function simplifies tasks for users and allows them to make changes once. Changes are propagated to the various operating systems automatically. Recovery and restart of the I/O partition are handled by the partition management tool and the hypervisor.

The I/O partition can provide a heartbeat to the hypervisor. This includes, for instance, periodically sending a signal or message to the hypervisor. Should the hypervisor fail to receive a heartbeat for a predetermined amount of time, it assumes the I/O partition has failed and automatically restarts the I/O partition. Error recovery may need to be performed in the consumer partitions, but the automatic restart is significantly better and faster than customer manual intervention to figure out what failed and what needs to be restarted.

The partition management tool enables centralized, simple, easy to use user interfaces. Currently, I/O adapters need to be configured in multiple ways, at least one per operating system type. Smart interfaces in the partition management tool can interact with multiple different operating system interfaces and provide a single consolidated interface to the user for configuring in the operating system physical I/O adapters owned by an I/O partition; configuring virtual I/O adapter drivers in the consumer partitions; and for configuring partitions (add/remove, specify operating system(s), specify memory/processor(s), assign I/O adapter to partition), as examples.

Described in detail herein is the provision of one or more I/O partitions, in which an I/O partition owns I/O adapters and enables autonomic, robust, secure, efficient, and centralized sharing of the adapters with operating systems or other code running in other partitions. The support for the adapters and other I/O resources is at the I/O partition and not the operating system. Sharing of adapters provides cost savings by increasing the utilization of individual adapters; decreasing the number of adapters used; and reducing the infrastructure costs of additional adapters (cabling, switches, management, etc.). Sharing of adapters increases value by increasing the speed of logical partition instantiation; and being able to easily address unexpected peaks by applying unutilized bandwidth to the additional demand.

An I/O partition is, for instance, firmware shipped with the server and appears as an extension to server hardware. There is no need for dedicated I/O processors, and it is maintained/upgraded consistent with other firmware on the server (for example, hypervisor and service processor firmware). No customer install is required, and it is robust because it is designed and optimized for the purpose of sharing I/O adapters (and not open operating system). Its support is consistent with other server firmware. (In other embodiments, one or more of the I/O partitions of a server may be implemented as other than firmware.)

A single tool, referred to herein as a partition management tool, facilitates adding/removing partitions on the server, including consumer partitions and I/O partitions (a consumer partition is configured in a manner similar to that of an I/O partition by using a configuration file); assigns an operating system or other code to run in a consumer partition; assigns processor(s) and memory to the partition; and configures I/O adapters owned by an I/O partition and identifies other partitions which are allowed to share the I/O adapters. The tool allows customers to easily, from a single tool, create one or more partitions, and assign virtual I/O resources to the one or more consumer partitions and physical I/O resources to the one or more I/O partitions.

Each operating system provides general support for a virtual device of a certain class (e.g. Ethernet or parallel SCSI, or iSCSI). The I/O partition supports a single interface to its sharing operating systems for each class of these devices. The idiosyncrasies of adapter interfaces are therefore restricted to the I/O partition. New adapters can thus be supported much faster and more simply by developing and testing adapter drivers in the I/O partition. Other operating systems can automatically pick up the support via the general virtual device interface for that class.

Failover (can be many-to-one spare) I/O adapters in an I/O partition can be provided with no knowledge of this function in operating systems that share the I/O adapters. This reduces the cost of providing a fully redundant configuration, as each operating system does not have to have dedicated failover adapters.

Multiple adapter functions, like Ethernet Link Aggregation, can be implemented in an I/O partition with no knowledge of this function in operating systems that share the I/O adapters by using a single virtual adapter interface. Advanced functions, like offload, can also be implemented in an I/O partition without requiring changes in the operating systems that share the adapters by using a single virtual adapter interface.

The partition management tool can create virtual I/O adapters in consumer partitions with a consistent user interface, even for different operating systems, simplifying systems management. In summary, the partition management tool facilitates creation of an I/O firmware partition that provides other partitions with the ability to share I/O in a robust, secure, autonomic and efficient manner using industry-standard I/O adapters. Advanced adapter functions, like Ethernet Link Aggregation and function offload, can be seamlessly provided to consumer partitions without any changes to their base operating systems or other control code. Sharing I/O adapters via the I/O firmware partition reduces cost of ownership, increases availability and flexibility and enables logical partitions to be instantiated on-demand without manual intervention. Moreover, by employing an I/O partition, recovery associated with the physical adapter and/or devices is isolated to that partition.

Although an example of an environment incorporating and using one or more aspects of the present invention is described herein, other embodiments may similarly include and/or use one or more aspects of the present invention without departing from the spirit of the present invention. For example, an environment may have more or less consumer partitions and/or I/O partitions than described herein. Further, a consumer partition may include no operating system, multiple operating systems, one or more other entities, such as control code, or a combination thereof. Further, the partitions may be other than logical partitions, such as zones or other types of partitions. In a further example, an I/O partition may be shared by partitions of multiple servers. Further, there may be more or less than the number of virtual adapter drivers and virtual adapter interfaces described herein. Many other variations may be provided without departing from the spirit of the present invention.

As a further example, other types of communications environments may incorporate and/or use one or more aspects of the present invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of facilitating access to input/output (I/O) resources of a partitioned environment comprising multiple logical partitions, said system comprising:
   a computer system comprising an I/O logical partition, the I/O logical partition comprising one logical partition of the multiple logical partitions of the partitioned environment, the multiple logical partitions running above a hypervisor of the partitioned environment, and interfaced via the hypervisor to one or more consumer logical partitions of the partitioned environment and providing access for the one or more consumer logical partitions to one or more I/O resources assigned to the logical I/O partition;
   wherein the computer system further comprises logic for employing, by at least one consumer logical partition of the one or more consumer logical partitions, the I/O partition to access at least one I/O resource of the one or more I/O resources assigned to the I/O logical partition;
   wherein the logic for providing the I/O logical partition utilizes a partition management tool in providing the I/O logical partition; and
   wherein the partition management tool facilitates at least one of managing the I/O logical partition, specifying one or more resources to be allocated to the I/O logical partition, and specifying one or more consumer logical partitions allowed to share at least one I/O resourced of the one or more I/O resources.

2. The system of claim 1, wherein the computer system comprises a plurality of I/O logical partitions, said plurality of I/O logical partitions being coupled to one or more consumer logical partitions.

3. The system of claim 1, wherein the I/O logical partition has allocated thereto one or more resources usable by the I/O logical partition, and wherein said computer system further comprises logic for dynamically adjusting an amount of the one or more I/O resources allocated to the I/O logical partition.

4. The system of claim 1, wherein the logic for employing the I/O partition by a consumer partition to access an I/O resource of the I/O partition comprises:
   logic for providing to a virtual adapter driver of the consumer logical partition a request to access the I/O resource of the I/O logical partition; and
   logic for communicating the request to a virtual adapter interface of the I/O logical partition, wherein the virtual adapter interface provides the request to a physical adapter driver of the I/O logical partition used to access the I/O resource.

5. The system of claim 4, wherein the logic for communicating comprises:
   logic for receiving, by the hypervisor of the partitioned environment the request from the virtual adapter driver of the consumer logical partition; and
   logic for making available by the hypervisor the request to the virtual adapter interface of the I/O logical partition.

6. The system of claim 1, wherein the I/O logical partition comprises a virtual adapter interface which is coupled to at least one virtual adapter driver of at least one consumer logical partition of the one or more consumer partitions, and wherein the virtual adapter interface of the I/O logical partition is an interface for a class of adapters.

7. The system of claim 1, wherein the I/O logical partition further provides a failover capability in which an I/O resource of the one or more I/O resources takes over for another I/O resource of the one or more I/O resources, transparent to one or more consumer logical partitions of the partitioned environment.

8. The system of claim 1, wherein the I/O logical partition supports one or more I/O resource functions transparent to one or more consumer logical partitions of the partitioned environment.

9. The system of claim 1, wherein the I/O logical partition further provides automatic workload balancing among one or more I/O resources owned by the I/O logical partition.

10. The system of claim 1, wherein the computer system further comprising:
    logic for detecting that the I/O logical partition is to be restarted; and
    logic for automatically restarting the I/O logical partition.

11. An article of manufacture comprising:
    at least one program storage device having computer readable programcode logic to facilitate access to input/output (I/O) resources of a partitioned environment comprising multiple logical partitions, the computer readable program code logic comprising:
    provide logic to provide an I/O logical partition in the partitioned environment, said I/O logical partition comprising one logical partition of the multiple logical partitions of the partitioned environment, the multiple logical partitions running above a hypervisor of the partitioned environment, and being interfaced via the hypervisor to one or more consumer logical partitions of the multiple logical partitions of the partitioned environment and providing access for the one or more consumer logical partitions to one or more I/O resources assigned to the I/O logical partition;
    employ logic to employ, by at least one consumer logical partition of the one or more consumer logical partitions, the I/O logical partition to access at least one I/O resource of the one or more I/O resources assigned to the I/O logical partition;
    wherein the provide logic provides the I/O logical partition with access to a partition management tool for providing the I/O logical partition; and
    wherein the partition management tool facilitates at least one managing the I/O logical partition, specifying one or more resources to be allocated to the I/O logical partition, and specifying one or more consumer logical partitions allowed to share at least one I/O resource of the one or more I/O resources.

12. The article of manufacture of claim 11, wherein the I/O logical partition has allocated thereto one or more resources usable by the I/O logical partition, and wherein said computer readable program code logic further comprises adjust logic to dynamically adjust an amount of the one or more I/O resources allocated to the I/O logical partition.

13. The article of manufacture of claim 11, wherein the employ logic to employ the I/O partition by a consumer partition to access an I/O resource of the I/O partition comprises:

provide logic to provide to a virtual adapter driver of the consumer logical partition a request to access the I/O resource of the I/O logical partition; and communicate logic to communicate the request to a virtual adapter interface of the I/O logical partition, wherein the virtual adapter interface provides the request to a physical adapter driver of the I/O logical partition used to access the I/O resource.

14. The article of manufacture of claim 11, wherein the I/O logical partition further provides a failover capability in which an I/O resource of the one or more I/O resources takes over for another I/O resource of the one or more I/O resources, transparent to one or more consumer logical partitions of the partitioned environment.

15. The article of manufacture of claim 11, wherein the I/O logical partition supports one or more I/O resource functions transparent to one or more consumer logical partitions of the partitioned environment.

16. The article of manufacture of claim 11, wherein the I/O logical partition further provides automatic workload balancing among one or more I/O resources owned by the I/O logical partition.

17. The article of manufacture of claim 11, further comprising:

detect logic to detect that the I/O logical partition is to be restarted; and restart logic to automatically restart the I/O logical partition.

* * * * *